United States Patent
Oberheide et al.

(10) Patent No.: US 10,116,453 B2
(45) Date of Patent: *Oct. 30, 2018

(54) METHOD FOR DISTRIBUTED TRUST AUTHENTICATION

(71) Applicant: Duo Security, Inc., Ann Arbor, MI (US)

(72) Inventors: Jon Oberheide, Ann Arbor, CA (US); Dug Song, Ann Arbor, MI (US); Adam Goodman, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,237

(22) Filed: Feb. 27, 2018

(65) Prior Publication Data

US 2018/0234251 A1    Aug. 16, 2018

Related U.S. Application Data

(63) Continuation of application No. 15/715,599, filed on Sep. 26, 2017, now Pat. No. 9,942,048, which is a
(Continued)

(51) Int. Cl.
*H04L 9/32* (2006.01)
*H04L 9/08* (2006.01)
(Continued)

(52) U.S. Cl.
CPC ............ *H04L 9/3247* (2013.01); *H04L 9/085* (2013.01); *H04L 9/30* (2013.01); *H04L 63/0838* (2013.01);
(Continued)

(58) Field of Classification Search
None
See application file for complete search history.

(56) References Cited

U.S. PATENT DOCUMENTS

| | | |
|---|---|---|
| 5,838,792 A | 11/1998 | Ganesan |
| 5,870,723 A | 2/1999 | Pare, Jr. et al. |

(Continued)

FOREIGN PATENT DOCUMENTS

EP    2639997    9/2013

OTHER PUBLICATIONS

Edge, Kenneth, et al. "The use of attack and protection trees to analyze security for an online banking system." System Sciences, 2007. HICSS 2007. 40th Annual Hawaii International Conference on. IEEE, 2007.

(Continued)

*Primary Examiner* — Gary S Gracia
(74) *Attorney, Agent, or Firm* — Jeffrey Schox; Padowithz Alce

(57) ABSTRACT

A method for distributed trust authentication of one or more users attempting to access one or more service providers operating on a network includes performing primary authentication of a user using a first authentication factor, generating a first partial digital signature for a first authentication response to the primary authentication, performing secondary authentication of the user using a second authentication factor, generating a second partial digital signature for the second authentication response to the secondary authentication, combining the first and second partial digital signatures to form a composite digital signature, and validating the composite digital signature.

12 Claims, 8 Drawing Sheets

Related U.S. Application Data continuation of application No. 15/465,467, filed on Mar. 21, 2017, now Pat. No. 9,825,765, which is a continuation of application No. 15/075,826, filed on Mar. 21, 2016, now Pat. No. 9,641,341.

(60) Provisional application No. 62/141,023, filed on Mar. 31, 2015.

(51) Int. Cl.
*H04L 9/30* (2006.01)
*H04L 29/06* (2006.01)
*G06F 21/00* (2013.01)

(52) U.S. Cl.
CPC ...... *H04L 63/102* (2013.01); *H04L 2463/082* (2013.01)

(56) References Cited

U.S. PATENT DOCUMENTS

| | | | |
|---|---|---|---|
| 6,119,096 A | 9/2000 | Mann et al. | |
| 6,209,091 B1 | 3/2001 | Sudia et al. | |
| 6,311,272 B1 | 10/2001 | Gressel | |
| 6,694,025 B1 | 2/2004 | Epstein et al. | |
| 6,758,394 B2 | 7/2004 | Maskatiya et al. | |
| 6,823,359 B1 | 11/2004 | Heidingsfeld et al. | |
| 6,934,858 B2 | 8/2005 | Woodhill | |
| 6,956,950 B2 | 10/2005 | Kausik | |
| 6,996,716 B1 | 2/2006 | Hsu | |
| 7,000,247 B2 | 2/2006 | Banzhof | |
| 7,093,133 B2 | 8/2006 | Hopkins et al. | |
| 7,096,354 B2 | 8/2006 | Wheeler et al. | |
| 7,107,246 B2 | 9/2006 | Wang | |
| 7,146,009 B2 | 12/2006 | Andivahis et al. | |
| 7,172,115 B2 | 2/2007 | Lauden | |
| 7,331,518 B2 | 2/2008 | Rable | |
| 7,334,255 B2 | 2/2008 | Lin et al. | |
| 7,340,600 B1 | 3/2008 | Corella | |
| 7,386,720 B2 | 6/2008 | Sandhu et al. | |
| 7,447,784 B2 | 11/2008 | Eun | |
| 7,463,637 B2 | 12/2008 | Bou-Diab et al. | |
| 7,496,662 B1 | 2/2009 | Roesch et al. | |
| 7,526,792 B2 | 4/2009 | Ross | |
| 7,562,382 B2 | 7/2009 | Hinton et al. | |
| 7,562,385 B2 | 7/2009 | Thione et al. | |
| 7,571,471 B2 | 8/2009 | Sandhu et al. | |
| 7,574,733 B2 | 8/2009 | Woodhill | |
| 7,599,493 B2 | 10/2009 | Sandhu et al. | |
| 7,630,493 B2 | 12/2009 | Sandhu et al. | |
| 7,711,122 B2 | 5/2010 | Allen et al. | |
| 7,716,240 B2 | 5/2010 | Lim | |
| 7,764,970 B2 | 7/2010 | Neil et al. | |
| 7,793,110 B2 | 9/2010 | Durfee et al. | |
| 7,836,501 B2 | 11/2010 | Sobel et al. | |
| 7,953,979 B2 | 5/2011 | Borneman et al. | |
| 7,958,362 B2 | 6/2011 | Hwang | |
| 7,961,645 B2 | 6/2011 | Gudipudi et al. | |
| 7,982,595 B2 | 7/2011 | Hanna et al. | |
| 7,983,987 B2 | 7/2011 | Kranzley et al. | |
| 8,010,779 B2 | 8/2011 | Sermersheim et al. | |
| 8,028,329 B2 | 9/2011 | Whitcomb | |
| 8,099,368 B2 | 1/2012 | Coulter et al. | |
| 8,136,148 B1 | 3/2012 | Chayanam et al. | |
| 8,141,146 B2 | 3/2012 | Ozeki | |
| 8,151,333 B2 | 4/2012 | Zhu et al. | |
| 8,161,527 B2 | 4/2012 | Curren | |
| 8,185,744 B2 | 5/2012 | Brown et al. | |
| 8,200,980 B1 | 6/2012 | Robinson et al. | |
| 8,225,392 B2 | 7/2012 | Dubrovsky et al. | |
| 8,245,044 B2 | 8/2012 | Kang | |
| 8,259,947 B2 | 9/2012 | Rose et al. | |
| 8,332,627 B1 | 12/2012 | Matthews et al. | |
| 8,335,933 B2 | 12/2012 | Humphrey et al. | |
| 8,340,287 B2 | 12/2012 | Sandhu et al. | |
| 8,340,635 B2 | 12/2012 | Herz et al. | |
| 8,380,192 B2 | 2/2013 | Kim et al. | |
| 8,381,297 B2 | 2/2013 | Touboul | |
| 8,397,301 B2 | 3/2013 | Hering et al. | |
| 8,402,526 B2 | 3/2013 | Ahn | |
| 8,418,168 B2 | 4/2013 | Tyhurst et al. | |
| 8,458,798 B2 | 6/2013 | Williams et al. | |
| 8,474,031 B2 | 6/2013 | Vennelakanti et al. | |
| 8,484,708 B2 | 7/2013 | Chern | |
| 8,495,720 B2 | 7/2013 | Counterman | |
| 8,499,149 B2 | 7/2013 | Chen | |
| 8,499,339 B2 | 7/2013 | Chao et al. | |
| 8,510,820 B2 | 8/2013 | Oberheide et al. | |
| 8,522,010 B2 | 8/2013 | Ozzie et al. | |
| 8,528,039 B2 | 9/2013 | Chakarapani | |
| 8,533,841 B2 | 9/2013 | Kulkarni et al. | |
| 8,538,028 B2 | 9/2013 | Yeap et al. | |
| 8,539,544 B2 | 9/2013 | Garimella et al. | |
| 8,539,567 B1 | 9/2013 | Logue et al. | |
| 8,548,426 B2 | 10/2013 | Smith | |
| 8,571,220 B2 | 10/2013 | Ollikainen et al. | |
| 8,578,162 B2 | 11/2013 | Jentzsch et al. | |
| 8,595,822 B2 | 11/2013 | Schrecker et al. | |
| 8,601,554 B2 | 12/2013 | Gordon et al. | |
| 8,612,305 B2 | 12/2013 | Dominguez et al. | |
| 8,627,438 B1 | 1/2014 | Bhimanaik | |
| 8,646,060 B1 | 2/2014 | Ben Ayed | |
| 8,646,086 B2 | 2/2014 | Chakra et al. | |
| 8,667,288 B2 | 3/2014 | Yavuz | |
| 8,689,287 B2 | 4/2014 | Bohmer et al. | |
| 8,700,729 B2 | 4/2014 | Dua | |
| 8,713,329 B2 | 4/2014 | Schneider | |
| 8,713,639 B2 | 4/2014 | Cheeniyil et al. | |
| 8,719,930 B2 | 5/2014 | Lapsley et al. | |
| 8,732,475 B2 | 5/2014 | Fahrny et al. | |
| 8,732,839 B2 | 5/2014 | Hohl | |
| 8,737,623 B2 | 5/2014 | Hart | |
| 8,745,703 B2 | 6/2014 | Lambert et al. | |
| 8,751,801 B2 | 6/2014 | Harris et al. | |
| 8,756,567 B2 | 6/2014 | Jentsch et al. | |
| 8,756,651 B2 | 6/2014 | Baer et al. | |
| 8,756,698 B2 | 6/2014 | Sidagni | |
| 8,763,077 B2 | 6/2014 | Oberheide et al. | |
| 8,806,609 B2 | 8/2014 | Gladstone et al. | |
| 8,811,613 B2 | 8/2014 | Teruyama | |
| 8,850,516 B1 | 9/2014 | Hrebicek et al. | |
| 8,862,097 B2 | 10/2014 | Brand et al. | |
| 8,891,772 B2 | 11/2014 | D Souza et al. | |
| 8,893,230 B2 | 11/2014 | Oberheide et al. | |
| 8,893,251 B2 | 11/2014 | Oberheide et al. | |
| 8,898,762 B2 | 11/2014 | Kang | |
| 8,909,926 B2 | 12/2014 | Brandt et al. | |
| 8,949,596 B2 | 2/2015 | Yin et al. | |
| 8,949,927 B2 | 2/2015 | Arnott et al. | |
| 8,966,587 B2 | 2/2015 | Nair et al. | |
| 8,984,276 B2 | 3/2015 | Benson et al. | |
| 9,037,127 B2 | 5/2015 | Raleigh | |
| 9,049,011 B1 * | 6/2015 | Agrawal | H04L 9/085 |
| 9,049,594 B2 | 6/2015 | Chen et al. | |
| 9,071,611 B2 | 6/2015 | Yadav et al. | |
| 9,076,343 B2 | 7/2015 | Chaar et al. | |
| 9,110,754 B2 | 8/2015 | Poonamalli et al. | |
| 9,118,656 B2 | 8/2015 | Ting et al. | |
| 9,122,888 B2 | 9/2015 | Devi | |
| 9,124,582 B2 | 9/2015 | Kalinichenko et al. | |
| 9,135,458 B1 | 9/2015 | Hankins, Jr. et al. | |
| 9,154,387 B2 | 10/2015 | Maki et al. | |
| 9,189,491 B2 | 11/2015 | Fushman et al. | |
| 9,201,644 B2 | 12/2015 | Klein et al. | |
| 9,203,841 B2 | 12/2015 | Neuman et al. | |
| 9,223,961 B1 | 12/2015 | Sokolov | |
| 9,225,840 B2 | 12/2015 | Malatack et al. | |
| 9,253,185 B2 | 2/2016 | Alaranta et al. | |
| 9,258,296 B2 | 2/2016 | Juthani | |
| 9,282,085 B2 * | 3/2016 | Oberheide | H04L 63/062 |
| 9,338,156 B2 | 5/2016 | Oberheide et al. | |
| 9,338,163 B2 | 5/2016 | Wendling et al. | |
| 9,386,003 B2 | 7/2016 | Kumar | |
| 9,391,980 B1 | 7/2016 | Krahn et al. | |

(56) References Cited

U.S. PATENT DOCUMENTS

| | | | |
|---|---|---|---|
| 9,430,938 B2 | 8/2016 | Proud | |
| 9,443,084 B2 | 9/2016 | Nice et al. | |
| 9,479,509 B2 | 10/2016 | Zeuthen | |
| 9,659,160 B2 | 5/2017 | Ligatti et al. | |
| 9,668,137 B2 | 5/2017 | Sigurdson et al. | |
| 9,706,410 B2 | 7/2017 | Sreenivas et al. | |
| 9,774,448 B2 | 9/2017 | Oberheide et al. | |
| 9,998,282 B2 | 6/2018 | Oberheide et al. | |
| 2002/0013898 A1 | 1/2002 | Sudia et al. | |
| 2002/0136410 A1 | 9/2002 | Hanna | |
| 2003/0061506 A1 | 3/2003 | Cooper et al. | |
| 2003/0115452 A1 | 6/2003 | Sandhu et al. | |
| 2003/0120931 A1* | 6/2003 | Hopkins | H04L 9/302 |
| | | | 713/180 |
| 2004/0139312 A1 | 7/2004 | Medvinsky | |
| 2004/0218763 A1* | 11/2004 | Rose | H04L 9/0891 |
| | | | 380/277 |
| 2005/0240522 A1* | 10/2005 | Kranzley | G06Q 20/02 |
| | | | 705/40 |
| 2006/0031938 A1 | 2/2006 | Choi | |
| 2006/0059569 A1 | 3/2006 | Dasgupta et al. | |
| 2006/0184787 A1* | 8/2006 | Sandhu | H04L 9/3271 |
| | | | 713/155 |
| 2006/0184788 A1* | 8/2006 | Sandhu | H04L 63/0442 |
| | | | 713/159 |
| 2007/0081667 A1* | 4/2007 | Hwang | H04L 9/3271 |
| | | | 380/30 |
| 2007/0250914 A1 | 10/2007 | Fazal et al. | |
| 2007/0258594 A1* | 11/2007 | Sandhu | H04L 9/0825 |
| | | | 380/277 |
| 2007/0284429 A1 | 12/2007 | Beeman | |
| 2007/0297607 A1 | 12/2007 | Ogura et al. | |
| 2008/0069347 A1* | 3/2008 | Brown | H04L 9/3066 |
| | | | 380/45 |
| 2008/0120411 A1 | 5/2008 | Eberle | |
| 2008/0229104 A1* | 9/2008 | Ju | H04L 9/3247 |
| | | | 713/169 |
| 2009/0055906 A1 | 2/2009 | Von Wendorff | |
| 2009/0077060 A1* | 3/2009 | Sermersheim | G06F 17/30923 |
| 2009/0167489 A1 | 7/2009 | Nan et al. | |
| 2009/0210705 A1* | 8/2009 | Chen | H04L 9/0891 |
| | | | 713/158 |
| 2009/0271863 A1 | 10/2009 | Govindavajhala et al. | |
| 2010/0023781 A1 | 1/2010 | Nakamoto | |
| 2010/0042954 A1 | 2/2010 | Rosenblatt et al. | |
| 2010/0131755 A1* | 5/2010 | Zhu | H04L 63/0815 |
| | | | 713/155 |
| 2010/0180001 A1 | 7/2010 | Hardt | |
| 2010/0274859 A1 | 10/2010 | Bucuk | |
| 2011/0026716 A1 | 2/2011 | Tang et al. | |
| 2011/0138469 A1 | 6/2011 | Ye et al. | |
| 2011/0197267 A1 | 8/2011 | Gravel et al. | |
| 2011/0219449 A1 | 9/2011 | St Neitzel et al. | |
| 2012/0227098 A1 | 9/2012 | Obasanjo et al. | |
| 2012/0321086 A1* | 12/2012 | D'Souza | H04L 9/0825 |
| | | | 380/278 |
| 2013/0060708 A1 | 3/2013 | Oskolkov et al. | |
| 2013/0110676 A1 | 5/2013 | Kobres | |
| 2013/0117826 A1* | 5/2013 | Gordon | G06F 21/31 |
| | | | 726/5 |
| 2013/0125226 A1 | 5/2013 | Shah et al. | |
| 2013/0239168 A1 | 9/2013 | Sreenivas et al. | |
| 2013/0246281 A1 | 9/2013 | Yamada et al. | |
| 2013/0312078 A1* | 11/2013 | Oberheide | H04L 63/0272 |
| | | | 726/9 |
| 2013/0326224 A1* | 12/2013 | Yavuz | H04L 9/3247 |
| | | | 713/176 |
| 2014/0156473 A1 | 6/2014 | Murphy | |
| 2014/0177842 A1 | 6/2014 | Yellepeddy et al. | |
| 2014/0201841 A1 | 7/2014 | Deshpande et al. | |
| 2014/0244993 A1* | 8/2014 | Chew | G06F 21/445 |
| | | | 713/2 |
| 2014/0245396 A1* | 8/2014 | Oberheide | H04L 63/08 |
| | | | 726/4 |
| 2016/0056962 A1 | 2/2016 | Mehtälä | |
| 2016/0134418 A1 | 5/2016 | Liu et al. | |
| 2016/0164866 A1 | 6/2016 | Oberheide et al. | |
| 2016/0165491 A1 | 6/2016 | Liu et al. | |
| 2016/0174112 A1 | 6/2016 | Liu et al. | |
| 2016/0286391 A1 | 9/2016 | Khan | |

OTHER PUBLICATIONS

Goldfeder et al., Securing Bitcoin wallets via a new DSA/ECDSA threshold signature scheme, http://www.cs.princeton.edu/~stevenag/threshold_sigs.pdf.

Neuenhofen, Kay, and Mathew Thompson. "A secure marketplace for mobile java agents." Proceeding of the second international Conference on Autonomous agents. ACM, 1998. (pp. 212-218).

Simske et al., "APEX: Automated Policy Enforcement eXchange", Sep. 21-24, 2010, ACM, pp. 139-142.

Symantec, Administration guide for symantec Endpoint protection and symantec network access control, 2009, version 11.00.05.00.00.

Symantec, Administration Guide for Symantec TM Endpoint Protection and Symantec Network Access Control, Aug. 1, 2007.

Yanqiong Zhu; et al. "Security Authentication Scheme Based on on Certificateless and Fingerprint Recognition" 2011 Seventh International Conference Intelligence and Security, 4/11 IEEE, pp. 817-820.

* cited by examiner

RELATED ART

US 10,116,453 B2

METHOD FOR DISTRIBUTED TRUST AUTHENTICATION

CROSS-REFERENCE TO RELATED APPLICATIONS

This application is a continuation of U.S. patent application Ser. No. 15/715,599, filed 26 Sep. 2017, which is a continuation of U.S. patent application Ser. No. 15/465,467, filed 21 Mar. 2017, which is a continuation of U.S. Pat. No. 9,641,341, filed 21 Mar. 2016, which claims the benefit of U.S. Provisional Application No. 62/141,023, filed 31 Mar. 2015, all of which are incorporated in their entireties by this reference.

TECHNICAL FIELD

This invention relates generally to the authentication field, and more specifically to a new and useful method for distributed trust authentication.

BACKGROUND

Modern businesses make use of a dizzying number of services and applications in day-to-day operation. Requiring employees to maintain multiple authentication credentials for these services and applications would result in crippling inconveniences and inefficiencies.

To address this issue, identity providers (IdP) were developed. Identity providers maintain identity information for service users and enable that information to be used for authenticating users with multiple service providers (SP). As a result, identity providers allow users to access many services and applications with a single set of credentials.

The tradeoff to the convenience of an IdP is that compromise of the IdP allows an attacker access to all of the services and applications linked to the IdP. Two-factor authentication (2FA) can be used to reduce the likelihood of compromise of individual credentials used to authenticate with the IdP. Unfortunately, in current security architectures, 2FA cannot help prevent unauthorized access if the IdP itself is compromised—full trust resides with the IdP. Thus, there is a need in the authentication field to create a new and useful method for distributed trust authentication. This invention provides such a new and useful system and method.

DESCRIPTION OF THE PREFERRED EMBODIMENTS

1. Overview

The following description of preferred embodiments of the invention is not intended to limit the invention to these preferred embodiments, but rather to enable any person skilled in the art to make and use this invention.

Figure 1:
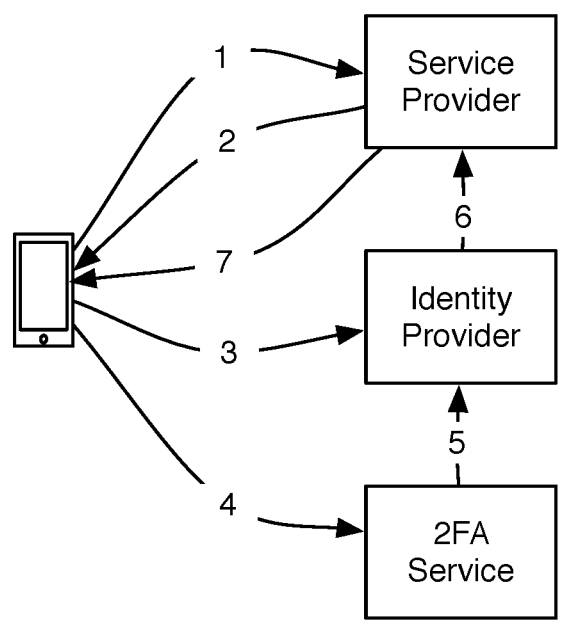
FIG. 1 is a flow diagram of a prior art method of two-factor authentication.

Traditional systems for two-factor authentication with an identity provider operate as shown in FIG. 1. When a user attempts to access a service provider (1), the user is redirected to authenticate with an identity provider (2). The user sends primary credentials (e.g., a password) to the identity provider (3) and secondary credentials (e.g., an SMS one-time password) to a two-factor authentication service (4), which may or may not be integrated with the identity provider. The two-factor authentication service sends the identity provider indication of successful second-factor authentication (5). The identity provider, after successfully authenticating the primary credentials and receiving indication of successful second-factor authentication, sends an authentication message to the service provider (6), which then allows the user to access the service provider (7).

One weakness in a system such as this is that trust is concentrated with the identity provider. If the identity provider is compromised, the two-factor authentication service no longer provides a barrier to unauthorized activity. Distributed trust authentication methods address this issue by distributing trust among multiple authorities, rather than concentrating trust in a single place.

2. Method

Figure 2:
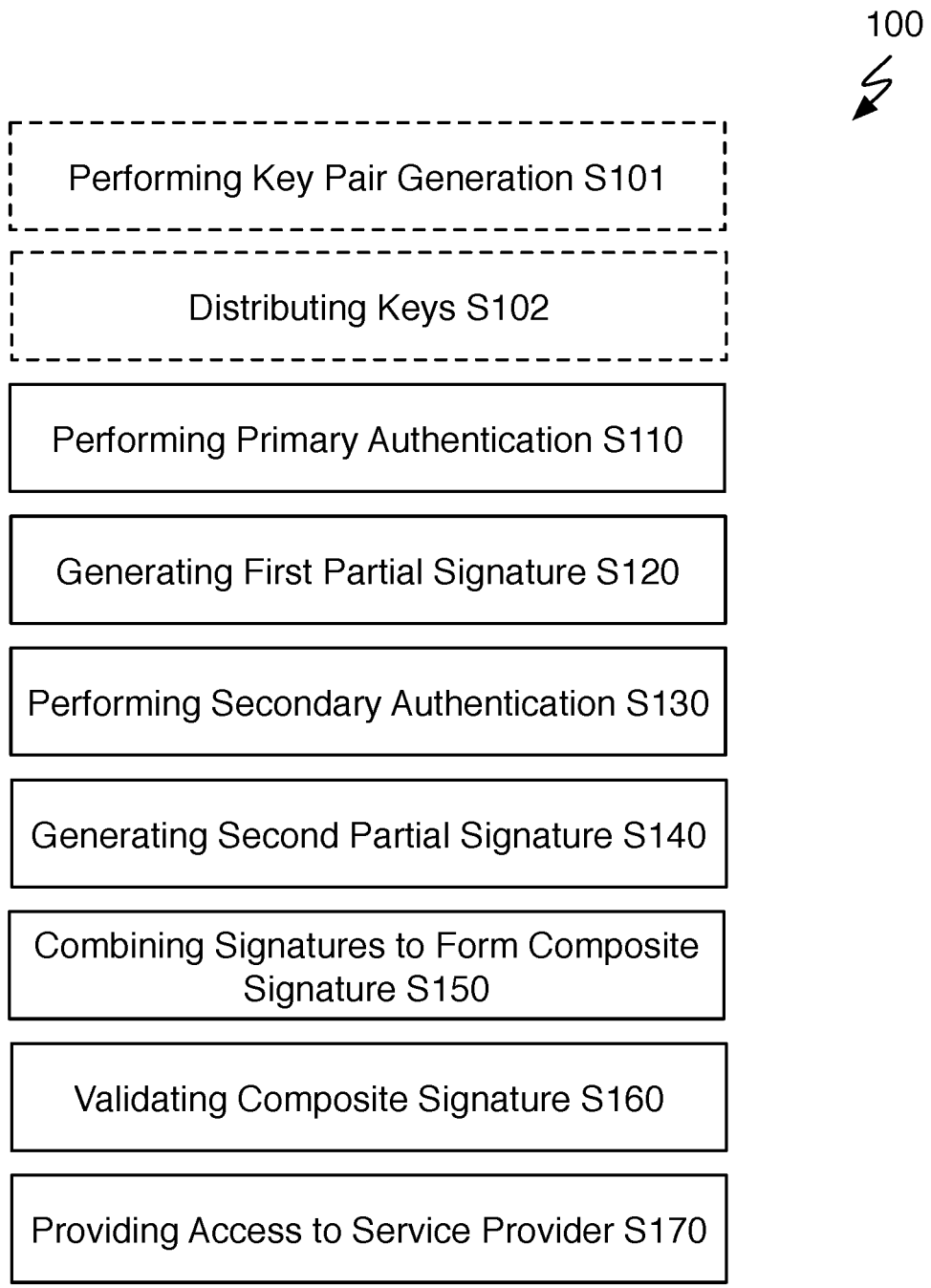
FIG. 2 is a flow diagram of a method of a preferred embodiment.

As shown in FIG. 2, a method 100 for distributed trust authentication of one or more users attempting to access one or more service providers operating on a network includes: performing primary authentication of a user using a first authentication factor S110, generating a first partial digital signature for a first authentication response to the primary authentication S120, performing secondary authentication of the user using a second authentication factor S130, generating a second partial digital signature for the second authentication response to the secondary authentication S140, combining the first and second partial digital signatures to form a composite digital signature S150, and validating the composite digital signature S160.

The method 100 can additionally or alternatively include: providing the user with access to the service provider S170, and generating key pairs S101.

The method 100 functions to enable authentication methods that distribute trust, in turn reducing security vulnerability of authentication systems. The method 100 is intended for implementation with two-factor authentication systems, but may additionally or alternatively be implemented with any multi-step and/or multi-factor authentication systems.

Figure 3:
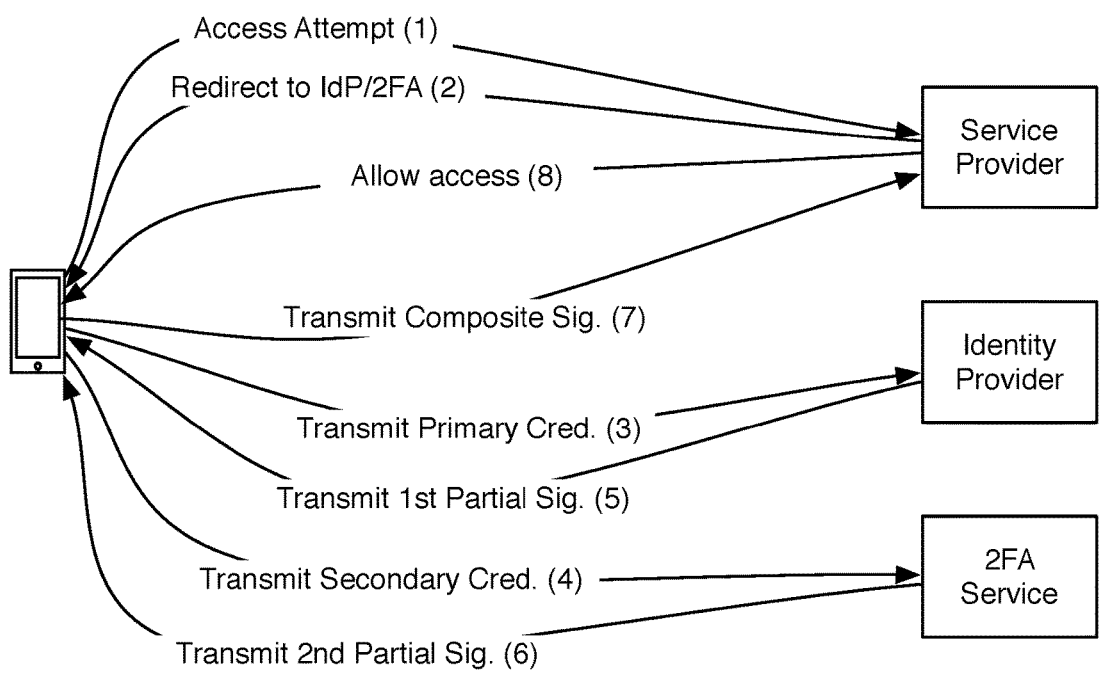
FIG. 3 is a flow diagram of authentication with a service provider using a method of a preferred embodiment.

An example of user authentication using the method 100 is as shown in FIG. 3. When a user attempts to access a service provider (1), the user is redirected to authenticate with an identity provider and a two-factor authentication service (either directly or indirectly through the identity provider) (2). The user sends primary credentials (e.g., a password) to the identity provider (3) and secondary credentials (e.g., an SMS one-time password) to a two-factor authentication service (4), which may or may not be integrated with the identity provider. The identity provider performs primary authentication (Step S110) and generates and then transmits a first partial digital signature resulting from this authentication to the user (Step S120, 5); likewise, the two-factor authentication service performs secondary authentication (Step S130) and generates and then transmits a second partial digital signature resulting from this authentication to the user (Step S140, 6). At the user's device, the first and second partial digital signatures are combined to form a composite digital signature (Step S150), which is transmitted to the service provider (7). The service provider validates the composite digital signature (Step S160 and then allows access to the user (8). For the composite digital signature to be validated, each of the partial digital signatures must be valid. Consequently, for an attacker to compromise security, the attacker must compromise both the security of the identity provider and the two-factor authentication service. Neither the identity provider nor the two-factor authentication service retain full trust, rather, trust is distributed between the two.

Note that devices used to access a service provider may be any suitable electronic device, including desktop computers, servers, smartphones, tablets, laptops, media players, cameras, measurement devices, gaming systems, vehicular computing devices, set-top boxes, and/or televisions.

The method 100 is enabled to distribute trust by application of a threshold digital signature scheme. Threshold digital signature schemes have their roots in threshold encryption, which was developed to allow a single shared cryptographic key to be split into multiple pieces (known as key shares). For encryption/decryption to be performed, some or all of the key shares must be recombined. In threshold encryption, the threshold refers to the number of key shares that must be recombined to perform a decrypt/encrypt operation. For example, in a threshold encryption scheme with a (2,3)-threshold, the cryptographic key is split into three key shares, at least two of which are required to perform any decrypt/encrypt operation. If Bob, Alice, and Carol each possess one of the three key shares, decryption/encryption can be performed by any pairing of the three (i.e., Bob and Alice, Bob and Carol, Alice and Carol).

Threshold encryption is strengthened against some of the vulnerabilities of standard encryption by this key sharing system; attackers must obtain at least the threshold number of key shares to compromise the system. Threshold encryption is still vulnerable, though, in that the key shares must be recombined in a single location to perform an encryption/decryption operation. If this location (e.g., a computer) is compromised, the recombined key could be compromised, obviating the need for an attacker to obtain multiple key shares.

Figure 5:
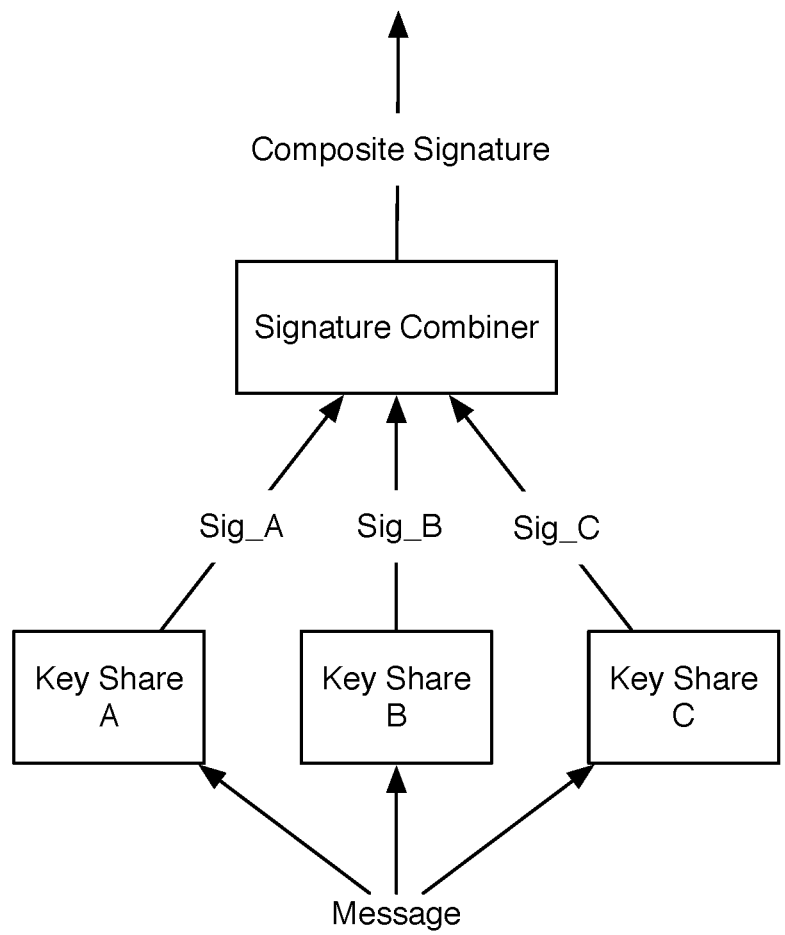
FIG. 5 is a schematic flow diagram of threshold digital signature generation.

Threshold digital signature schemes are based in threshold encryption, but utilize cryptographic signing/verification techniques to avoid the combination of multiple key shares (and thus the possibility of exposing a recombined private key at any location). For example, as shown in FIG. 5, a message is signed by Alice, Bob, and Carol, each using a key share of a private encryption key (key share A, B, and C respectively). Each of the digital signatures of Alice, Bob, and Carol (known as partial digital signatures) are combined to form a composite digital signature. The composite digital signature can then be verified using a public key paired to the private encryption key without the private encryption key ever having to be generated through recombination. Because the private key shares themselves never need to be recombined, an attacker attempting to compromise the threshold digital signature scheme must obtain at least a threshold number of key shares—there is no opportunity to compromise the scheme by compromising the point of digital signature recombination.

The method 100 utilizes threshold digital signature schemes as a basis for strengthening multi-factor and/or multi-step authentication. More specifically, the method 100 preferably enables the distribution of trust between an identity provider (which performs primary authentication for a user) and a two-factor authentication service (which performs secondary authentication for a user).

2.1 Performing Primary Authentication.

Step S110 includes performing primary authentication of a user using a first authentication factor. Step S100 functions to authenticate a user using a first authentication factor. Step S110 is preferably performed by a primary authentication service (e.g., an identity provider) in response to a user's attempt to access a service provider (e.g., a user providing a username and password for a user account associated with the service provider that the user is attempting to access with a user device associated with the user), but may additionally or alternatively be performed by any suitable authentication service for any reason, at any time. Step S110 is preferably performed by an identity provider utilizing one or more of Security Assertion Markup Language (SAML), OpenID Connect (OIDC), and Active Directory Federation Service (ADFS) protocols, and/or any other suitable service.

Step S110 preferably includes authenticating a user using a knowledge factor (e.g., something the user knows), but may additionally or alternatively include authenticating a user using any suitable authentication factor (e.g., possession factors, inherence factors). A knowledge factor can include any one or more of: a username, an e-mail address, a password, an answer to a question (e.g., an answer to a personal inquiry). Passwords can be any combination of verbal (e.g., a specific word), numeric (e.g., a numeric PIN number), visual (e.g., a color), and/or any suitable form. A possession factor can include one or more of a user device, a code transmitted to a user (e.g., a one-time password, a code transmitted through SMS, phone call, e-mail, mail, etc.), disconnected tokens (e.g., tokens with no connection to the user device), connected tokens (e.g., tokens physically connectable to the user device, card readers, wireless tags, USB tokens, etc.), and/or any other suitable possession factor. An inherence factor can include one or more of: a biometric approach (e.g., fingerprint reader, retina scanner, voice recognition, etc.), other factors associated with the user, and/or any other suitable factor.

Step S110 preferably includes verifying a user's submitted authentication factor against a database of known authentication factors; additionally or alternatively, Step S110 may include verifying the authentication factor in any suitable manner. For example, if a user has been previously authenticated, Step S110 may include recognizing a cookie or other token of previous authentication. After verification (e.g., in response to primary authentication), Step S110 preferably includes generating an authentication response to the primary authentication. The authentication response is preferably generated at the primary authentication service (which performs primary authentication of the user), but can additionally or alternatively be generated at any other suitable entity. Authentication responses (e.g., an authentication response generated by an authentication system) may be any suitable authentication response that indicates successful primary authentication, although the authentication response is preferably not identical across authentication attempts (preventing attackers from simply reusing encrypted authentication responses). Additionally or alternatively, the authentication response can indicate a failed primary authentication, a probability, and/or any other suitable indication. The form of authentication responses can include any one or more of verbal content, numerical content, graphical content, audio content, and/or any other suitable form.

In a first variation of Step S110, performing primary authentication includes performing, at an identity provider, primary authentication in response to a authentication request by a service provider. In this variation, the identity provider is preferably operating on a centralized network on which a service provider (e.g., a provider of the service that a user is attempting to access) is also operating. Additionally or alternatively, the identity provider and the service provider can communicate through other means (e.g., WiFi, Bluetooth, etc.). However, the identity provider and the service provider can communicate (e.g., transmission of an authentication request from the service provider to the identity provider) through any suitable mechanism.

In a second variation of Step S110, performing primary authentication includes performing primary authentication at an identity provider integrated with the service provider. In this variation, the identity provider and the service provider can be the same entity, such that the entity performing primary authentication is the service provider. Alternatively, the relationship between the identity provider and the service provider is one of plugin and existing software. However, the identity provider and the service provider can have any suitable relationship.

2.2 Generating a first partial digital signature.

Step S120 includes generating a first partial digital signature for a first authentication response to the primary authentication. Step S120 functions to generate a partial digital signature for the authentication response generated in Step S110.

Step S120 preferably includes signing the authentication response generated in Step S110 by generating a hash for the authentication response (e.g., an authentication response to primary authentication using a knowledge factor) and encrypting that hash using a first private key share of a private key according to an RSA-based digital signature scheme. Additionally or alternatively, Step S120 may include signing the authentication response in any suitable manner using the first key share with any suitable digital signature scheme. In a specific example, the private key comprises a first and a second private key share, where the first private key share is stored at the primary authentication system (e.g., to be used in generating a first partial digital signature). The second private key share can be stored at the secondary authentication system (e.g., to be used in generating a second partial digital signature).

Step S120 preferably includes generating the first partial digital signature according to a signing algorithm of "Practical Signal Thresholds", published by Victor Shoup in the Eurocrypt'00 Proceedings of the 19th International conference on theory and application of cryptographic techniques, pp 207-220, the entirety of which is incorporated by this reference. Additionally or alternatively, Step S120 may include generating the first partial digital signature according to any suitable signing algorithm.

Step S120 is preferably performed by the same entity performing Step S110; likewise, Step S120 is preferably performed by a primary authentication service such as an identity provider utilizing one or more of Security Assertion Markup Language (SAML), OpenID Connect (OIDC), and Active Directory Service Federation (ADFS) protocols (although these protocols may be adapted to the threshold digital signature scheme described herein). However, Step S120 can be additionally or alternatively performed by any suitable entity.

Generating a first partial digital signature preferably includes generating the first partial digital signature in response to generating a first authentication response to a successful primary authentication by the primary authentication system. Additionally or alternatively, the first partial digital signature can be generated at any suitable time in relation to any other steps of the method 100, but can be generated at any suitable time generally.

2.3 Performing Secondary Authentication.

Step S130 includes performing secondary authentication using a second authentication factor. Step S130 functions to authenticate a user using a second authentication factor. Step S130 is preferably performed by a secondary authentication system (e.g., a two-factor authentication service) in response to a user's attempt to access a service provider, but may additionally or alternatively be performed by any suitable authentication service for any reason, at any time. Step S130 is preferably performed in response to a request by the identity provider (or other authenticator) of Step S110 for second-factor authentication. For example, a user may attempt to access a service provider, which redirects the user to an identity provider, which in turn requests a two-factor authentication service to authenticate the user (in addition to the identity provider performing primary authentication). In this way, Step S130 may be utilized with service providers configured to authenticate against standard identity providers (preventing the need for special configuration of service providers to be used with the method 100). Additionally or alternatively, Step S130 may be initiated in response to a direct request from a service provider (or from any other suitable source. In a specific example, the method 100 can include: transmitting a secondary authentication request from the primary authentication system to the secondary authentication system in response to successful primary authentication of the first user, where performing the secondary authentication comprises performing the secondary authentication only after receiving the secondary authentication request. However, performing secondary authentication can be performed at any suitable time in relation to other steps of the method 100, or at any suitable time generally.

Step S130 preferably includes authenticating a user using a possession factor (e.g., a random one-time password sent over SMS to a cell phone when a user is attempting to access a service provider with a computer), but may additionally or alternatively include authenticating a user using any suitable authentication factor (e.g., knowledge factors, inherence factors). Some examples of factors that may be used for authentication in Step S130 include smartphone push authentication, phone call authentication, universal second factor (U2F) authentication, and biometric authentication. In a variation, the method 100 includes receiving a first authentication factor from a first user device attempting to access a service provider, the first user device associated with a user; transmitting a possession factor to a second user device associated with the user.

Step S130 preferably includes verifying a user's submitted authentication factor against a database of known authentication factors or an authentication algorithm; additionally or alternatively, Step S130 may include verifying the authentication factor in any suitable manner. For example, if a user has been previously authenticated, Step S130 may include recognizing a cookie or other token of previous authentication. After verification, Step S130 preferably includes generating an authentication response to the secondary authentication. The authentication response may be any suitable authentication response that indicates successful secondary authentication, although the authentication response is preferably not identical across authentication attempts (preventing attackers from simply reusing encrypted authentication responses). In a variation, the method 100 can include transmitting the first authentication response (e.g., from the primary authentication system) to the secondary authentication system, wherein generating the second authentication response includes generating the second authentication response based on the first authentication response. Generating the second authentication response can include duplicating the first authentication response. The duplicate copy of the first authentication response can be used as the second authentication response, such that the first and the second authentication responses are identical.

The authentication response generated in Step S130 is preferably identical to the authentication response generated in Step S110 but the two authentication responses may alternatively be non-identical. Stated alternatively, the messages signed by Step S120 and Step S140 are preferably identical, but may alternatively be non-identical.

2.4 Generating a Second Partial Digital Signature.

Step S140 includes generating a second partial digital signature for the second authentication response to the secondary authentication. Step S140 functions to generate a partial digital signature for the authentication response generated in Step S130.

Step S140 preferably includes signing the authentication response generated in Step S130 by generating a hash for the authentication response (e.g., a second authentication response to secondary authentication using a possession factor) and encrypting that hash using a second key share of a private key (e.g., the private key comprising a first key share stored at the primary authentication system) according to an RSA-based digital signature scheme. Additionally or alternatively, Step S140 may include signing the authentication response in any suitable manner using the second key share.

Step S140 preferably includes generating the first partial digital signature according to a signing algorithm of "Practical Signal Thresholds". Additionally or alternatively, Step S120 may include generating partial digital signatures according to any suitable signing algorithm.

Step S140 is preferably performed by the same entity performing Step S130; likewise, Step S140 is preferably performed by a secondary authentication service (e.g., a two-factor authentication service). However, Step S140 can additionally or alternatively be performed by any suitable entity.

In a first variation, Step S140 can include generating the second partial digital signature in response to successful secondary authentication of the user. In a second variation, step S140 can include generating the second partial digital signature in response to both of successful primary authentication and successful secondary authentication. However, generating the second partial digital signature can be performed at any suitable time in relation to any steps of the method 100, or at any suitable time generally.

2.5 Combining Partial Digital Signatures.

Step S150 includes combining the first and second partial digital signatures to form a composite digital signature. Step S150 functions to form a digital signature that can be validated against a public key known by a service provider (or other entity), the public key corresponding to the private key formed by the combination of key shares distributed to the first and second authentication services (e.g., the IdP and 2FA service). This composite digital signature thus represents the digital signatures of both authentication services for a given authentication message, signifying that the authentication message transmitted has been asserted as true by both authentication services. This is distinct from a typical IdP+2FA service scheme, where the IdP speaks for itself as well as the two-factor authentication service.

Step S150 preferably includes combining the first and second partial digital signatures according to a combination algorithm described in "Practical Signal Thresholds". Additionally or alternatively, Step S150 may include combining the first and second partial digital signatures in any suitable manner.

Step S150 is preferably performed by the primary authenticator (e.g., an IdP). Additionally or alternatively, Step S150 may be performed by a user (e.g., the user's device receives partial digital signatures from both the primary and secondary authenticators and combines them on the device before transmitting the combined digital signature to a service provider) or by any other suitable entity. In a specific example, the method 100 can include transmitting the first partial digital signature from the primary authentication system to a user device attempting to access a service provider (e.g., transmitting the first partial digital signature to a user laptop attempting to access a payroll service operating on a company's centralized network); and transmitting the second partial digital signature from the secondary authentication system to the user device (e.g., transmitting the second partial digital signature to the user laptop), wherein combining the first and the second partial digital signatures includes combining the first and the second partial digital signatures at the user device (e.g., combining the first and the second partial digital signatures at the user laptop. Additionally or alternatively, combining partial digital signatures can be performed at a second user device (e.g., a user device not attempting to access a service provider, but used as a possession factor in secondary authentication). However, combining partial digital signatures can be partially or fully performed at a primary authentication system, a secondary authentication system, a service provider, and/or any other suitable entity at any suitable time.

Step S150 can additionally or alternatively include transmitting the composite digital signature. Transmitting the composite digital signature preferably includes transmitting the composite digital signature to a service provider (e.g., the service provider that a user is attempting to access) with at least one of the first and the second authentication responses (e.g., a first authentication response generated by a primary authentication system, a second authentication response generated by a secondary authentication system).

The composite digital signature is preferably transmitted from the user device to the service provider operating on the network, but can be transmitted by any suitable component to any suitable entity. The composite digital signature can be transmitted by an entity distinct from the entity transmitting at least one of the first and the second authentication responses. For example, the user device can transmit the composite digital signature to the service provider, and the primary authentication system can transmit the first authentication response to the service provider. Additionally or alternatively, the same entity can transmit the composite digital signature and at least one of the first and the second authentication responses. However, the first and the second authentication responses can be transmitted by any suitable component to any suitable entity.

The composite digital signature can be transmitted to the service provider before, in parallel with, and/or after transmission of at least one of the first and the second authentication responses to the service provider. However, the composite digital signature and at least one of the first and the second authentication responses can be transmitted to the service provider at any suitable time.

2.6 Validating a Composite Digital Signature.

Step S160 includes validating the composite digital signature. Step S160 functions to verify that the digital signature accompanying an authentication response is valid (and thus the authentication response can be trusted). Step S160 is preferably performed according to the signing processes of Steps S120 and S140; i.e., Step S160 is preferably performed by generating a hash for the signed authentication response (e.g., an authentication response generated and/or transmitted by the primary or secondary authentication systems), decrypting the composite digital signature (e.g., the composite digital signature transmitted by a user device to the service provider) using a public key corresponding to the private key used to generate the private key shares of Steps S120 and S140, and comparing the decrypted digital signature to the authentication response hash. Similarly to Steps S120 and S140, Step S160 is preferably performed in accordance with an RSA-based digital signature scheme. Additionally or alternatively, Step S160 may include validating the composite digital signature in any suitable manner.

Step S160 preferably includes validating the composite digital signature at a service provider, but may additionally or alternatively include validating the composite digital signature at any suitable location. Validating the composite digital signature is preferably performed by a service provider after the service provider has received the composite digital signature and at least one of the first and the second authentication responses, but can be performed at any suitable time.

2.7 Providing Access to a Service Provider.

The method 100 can additionally or alternatively include allowing a user access to the service provider based on the authentication response S170, which functions to enable an authenticated user to access the service provider. Step S170 can include allowing user access through the user device providing the primary authentication credentials used in Step S110. Additionally or alternatively, access can be conferred to any suitable user device associated with the user (e.g., a second user device providing secondary authentication credentials), or any suitable device not associated with the user. However, the method 100 may additionally include performing any suitable action after composite digital signature validation Regarding Step S170, providing a user with access to the service provider is preferably performed by the service provider. Additionally or alternatively, access can be conferred by a primary authenticator (e.g., an identity provider), a secondary authenticator (e.g., a 2FA service), and/or any other suitable entity.

With respect to Step S170, providing a user with access to the service provider is preferably in response to successful validation of the composite digital signature. In a specific example, the method 100 can include: receiving the composite digital signature at the service provider; decrypting the composite digital signature using a public key (e.g., a public key corresponding to the private key in which private key shares are distributed to the primary and secondary authenticators) stored at the service provider; validating the decrypted composite digital signature; providing a user with access to the service provider in response to successful validation. However, a user can be provided with access to the service provider at any suitable time in relation to any suitable step of the method, or at any suitable time.

2.8 Generating Key Pairs.

The method 100 may additionally include performing key pair generation S101. Step S101 includes generating the private key shares and public key used for authentication. The keys are preferably generated according to RSA key generation algorithms; additionally or alternatively, the keys may be generated in any suitable manner. The private key preferably is preferably restricted as follows: the public exponent must be a prime exceeding 1 (the threshold) and the modulus must be the product of two "strong" primes. However, the private key can be restricted in any suitable manner.

Each service provider preferably has a distinct key pair; additionally or alternatively, service providers may share key pairs.

Key generation is preferably performed by the two-factor authentication service (responsible for performing Steps S130 and S140), but may additionally or alternatively be performed by any suitable entity.

Step S101 may additionally or alternatively include distributing the key shares and public key S102. After an entity (e.g., a service provider, an identity provider, a two-factor authentication service, or an end user) generates the keys, they must be distributed to their intended locations. For example, Step S101 may include generating a set of two private key shares and a public key, and distributing the public key to a service provider, while distributing the first private key share to an identity provider and the second private key share to a two-factor authentication service. Entities not receiving a private key share preferably do not have access to the private key share. In a specific example, Step 101 can include distributing a first private key share of a private key to a primary authentication system, a second private key share of the private key to a secondary authentication system, and a public key to a service provider, where the secondary authentication system and the service provider do not have access to the first private key share, and where the primary authentication system and the service provider do not have access to the second private key share. However, distribution of keys or key shares, and restriction of access to such keys or key shares, can be performed in any suitable manner.

In a first variation, Step S101 can include generating and/or distributing replacement keys without changing authentication factors required for successful authentication of a user attempting to access a service provider operating on the network. For example, the method 100 can additionally or alternatively include: distributing a first replacement private key share a of a second private key (e.g., a private key share replacing a first private key share of a first private key, where the private key share is of a newly generated second private key) to a primary authentication system, a second replacement private key share of the second private key to a secondary authentication system, and a replacement public key paired with the second private key to a service provider; performing, at the primary authentication system, in response to a second attempt of the user to access the service provider, primary authentication of the user using the first authentication factor (e.g., the same authentication factor used in primary authentication of a user's first attempt to access the service provider before replacement keys are distributed); generating, at the primary authentication system, a third authentication response (e.g., an authentication response that can be the same as a first and/or second authentication response generated by the authentication systems in a user's first attempt to access the service provider) to the primary authentication performed in response to the second attempt; generating, at the primary authentication system, a third partial digital signature (e.g., a different partial digital signature due to using a new first replacement private key share) for the third authentication response using the first replacement private key share; performing, at the secondary authentication system, in response to the second attempt of the user to access the service provider, secondary authentication of the user using the second authentication factor; generating, at the secondary authentication system, a fourth authentication response to the secondary authentication performed in response to the second attempt; generating, at the secondary authentication system, a fourth partial digital signature for the fourth authentication response using the second replacement private key share; combining the third and the fourth partial digital signatures, resulting in a second composite digital signature (e.g., a composite digital signature different from the first composite digital signature generated for a user attempt to access the service provider); transmitting the second composite digital signature to the service provider with at least one of the third and the fourth authentication responses; validating, at the service provider, the second composite digital signature using the replacement public key; and providing the user with access to the service provider in response to successful validation of the second composite digital signature. In the first variation, the method 100 can additionally or alternatively include preventing access to the service provider using the first and the second private key shares after distributing the first and the second replacement private key shares.

In a specific example of the first variation, a private key share stored at an identity provider can be compromised. In response, a network administrator can generate a new pair of keys, and distribute private key shares of the replacement private key to the primary and secondary authentication systems operating on the network. The network administrator can choose to not replace the authentication factors associated with the primary and secondary authentication systems, such that the authentication factors continue to work with the primary and secondary authentication systems using the replacement private key shares in generating partial digital signatures for the corresponding authentication responses.

Regarding the first variation, any number and/or type of replacement key pairs can be generated and/or distributed. Replacement key pairs can be automatically generated and/or distributed in response to detecting unauthorized use of a private key share and/or public key (e.g., a hacker compromising a private key share of a secondary authentication system). Additionally or alternatively, replacement key pairs can be generated and/or distributed at regular time intervals (e.g., every day, every week, every month, etc.), manually (e.g., through action of a network administrator), and/or at any suitable time. However, generating, distributing, and/or using replacement keys and/or key shares can be performed in any suitable manner. Further, one or more key shares and/or keys can have any suitable relationship (e.g., 1:1, more than 1:1, 1:more than 1) with one or more authentication factors.

In a second variation, Step S101 can include using alternative authentication factors associated with one or more authentication systems without generating and distributing replacement keys. For example, the method 100 can additionally or alternatively include: performing, at a primary authentication system, in response to a second attempt of the user to access the a service provider, primary authentication of the user using a third authentication factor (e.g., an authentication factor replacing a first authentication factor used by the primary authentication system in a user's first attempt to access the service provider); generating, at the primary authentication system, a third authentication response (e.g., generated after a first and a second authentication response from the user's first attempt to access the service provider) to the primary authentication performed in response to the second attempt; generating, at the primary authentication system, a third partial digital signature for the third authentication response using the first private key share (e.g., the same private key share used in generating a first partial digital signature for a first authentication response to primary authentication using a first authentication factor in a user's first attempt to access the service provider); performing, at the secondary authentication system, in response to a second attempt of the user to access the service provider, secondary authentication of the user using a fourth authentication factor (e.g., an authentication factor replacing a second authentication factor used by the secondary authentication system in a user's first attempt); generating, at the secondary authentication system, a fourth authentication response to the secondary authentication performed in response to the second attempt; generating, at the secondary authentication system, a fourth partial digital signature for the fourth authentication response using the second private key share (e.g., the same private key share sued in generating a second partial digital signature for a second authentication response to secondary authentication using a second authentication factor in the user's first attempt); combining the third and the fourth partial digital signatures, resulting in a second composite digital signature; transmitting the second composite digital signature to the service provider with at least one of the third and the fourth authentication responses; validating, at the service provider, the second composite digital signature using the public key (e.g., the same public key used in validating a first composite digital signature from the user's first attempt); and providing the user with access to the service provider in response to successful validation of the second composite digital signature. In the second variation, the method 100 can additionally or alternatively include, at the primary authentication system, refusing to perform primary authentication of the first user using the first authentication factor.

In a specific example of the second variation, a user's knowledge authentication factor (e.g., a username and password) can be compromised. Without needing to replace the private key shares stored at primary and secondary authentication systems, a network administrator can replace the compromised knowledge authentication factor with a new authentication factor that is compatible with authentication systems using the same private key shares.

Regarding the second variation, any number and/or type of alternative authentication factors can be implemented with any suitable authentication system. Replacement authentication factors can be automatically implemented with an authentication system in response to detecting unauthorized access to an authentication factor (e.g., a hacker compromising a user name and password knowledge factor associated with the service provider), but can be implemented at any suitable time (e.g., at time intervals, manually, etc.). Primary and/or secondary authentication systems preferably implement alternative authentication factors, but implementation can be performed by any suitable entity. However, using one or more alternative authentication factors with one or more authentication systems can be performed in any suitable manner in relation to generating and/or distributing key shares, and/or in any suitable manner generally.

2.9 Authentication Approaches.

While the method 100 is described with respect to primary and secondary authentication, the method 100 may additionally or alternatively be used with any number of authentication methods. Authentication methods can include any number and/or combination of users, user devices, service providers, keys, key shares, authentication systems, authentication factors, authentication responses, digital signatures (e.g., partial, composite, etc.), and/or any other suitable component. Any suitable component(s) can have any suitable relationship (e.g., 1:1, more than 1:1, 1:more than 1, overlapping private key shares between private keys, etc.) with any other suitable component. For example, Step S160 may require that the composite digital signature be formed from three or more partial digital signatures. Further, the method 100 may be utilized for any type of authentication (i.e., two 2FA services instead of an IdP and a 2FA service).

The threshold digital signature scheme used by the method 100 is preferably an (k,l)—threshold digital signature scheme where k=1; that is, the number of partial digital signatures required to form a valid composite digital signature is equal to the number of partial key shares generated. Additionally or alternatively, the method 100 may use a (k,l)—digital signature scheme where k<l. This may be particularly useful in situations where multiple secondary authentication services are available, and users need only authenticate with a subset of those (e.g., user must authenticate with a password and either biometric data or SMS one-time password, but not both—and the biometric data authentication is separate from the SMS one-time password authentication).

2.9.A Authentication Approaches—k<l Digital Signature Scheme

Figure 6:
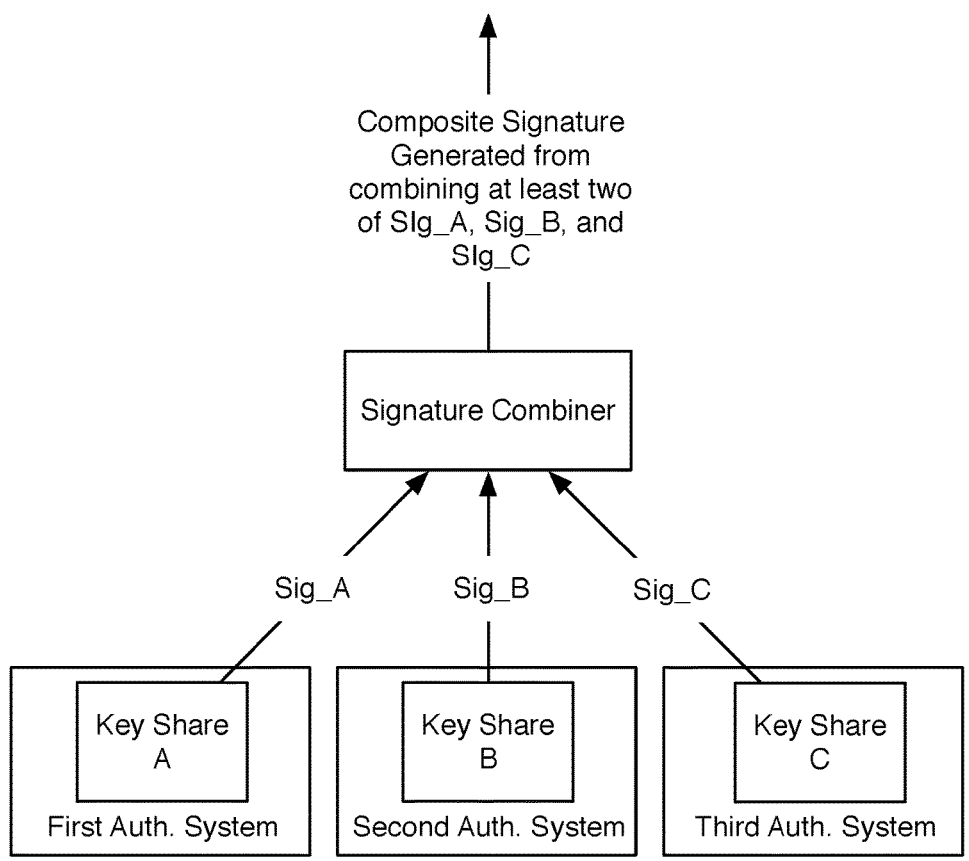
FIG. 6 is a schematic flow diagram of (k,l)-threshold digital signature generation where k<l.
Figure 7:
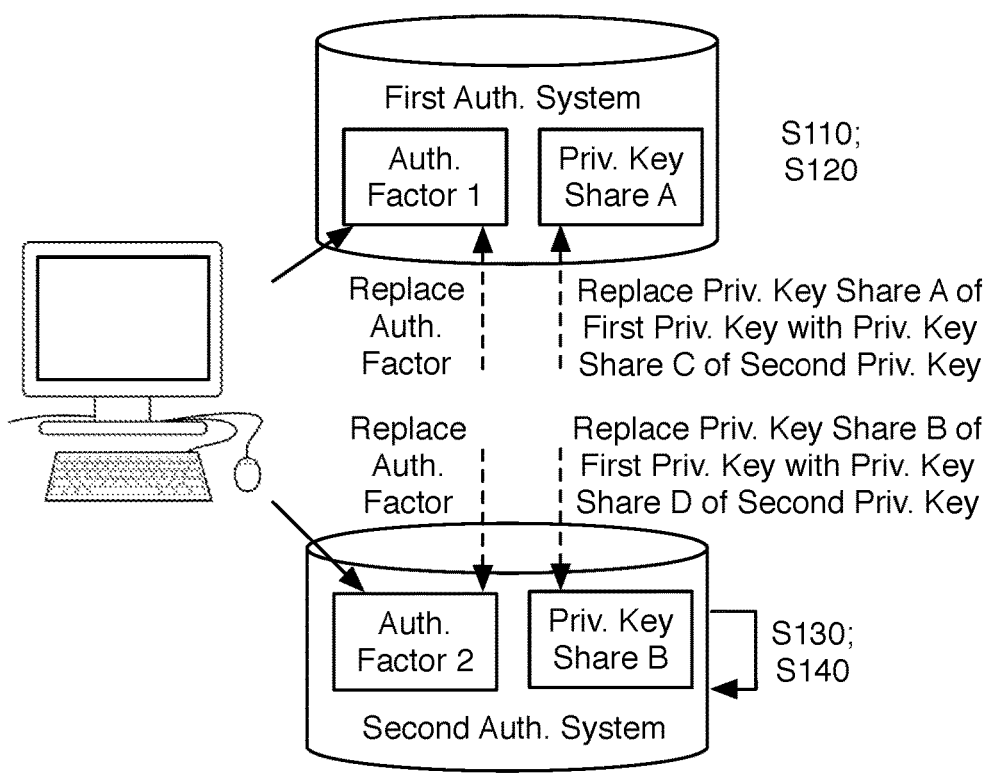
FIG. 7 is a schematic flow diagram of authentication with replacement key shares and/or authentication factors.

As shown in FIG. 6, in a first variation, the method 100 can include using a k<l digital signature scheme in a (k,l)—digital signature scheme. For example, the method 100 can additionally or alternatively include: distributing a first private key share of a private key to a first authentication system (e.g., an Active Directory service), a second private key share of the private key to a second authentication system (e.g., an authentication system using a possession factor for authentication), a third private key share of the private key to a third authentication system (e.g., an authentication system using an inherence factor for authentication), and a public key to a service provider (e.g., the service provider that a user is attempting to access), wherein the second private key share is non-identical to the third private key share; wherein the second authentication system, the third authentication system, and the service provider do not have access to the first private key share, wherein the first authentication system, the third authentication system, and the service provider do not have access to the second private key share, and wherein the first authentication system, the second authentication system, and the service provider do not have access to the third private key share; performing, at the first authentication system, in response to an attempt of a user to access the service provider, primary authentication of the user using a first authentication factor (e.g., user name and password); generating, at the first authentication system, a first authentication response to the primary authentication; generating, at the first authentication system, a first partial digital signature for the first authentication response using the first private key share; performing, at least one of a second and a third authentication process; wherein the second authentication process includes performing, at the second authentication system, in response to the attempt of the user to access the service provider, secondary authentication of the user using a second authentication factor (e.g., the second authentication system can perform authentication with a one-time password transmitted over the phone); generating, at the second authentication system, a second authentication response to the secondary authentication of the user using the second authentication factor; generating, at the second authentication system, a second partial digital signature for the second authentication response using the second private key share; combining the first and second partial digital signatures, resulting in a first composite digital signature; and transmitting the first composite digital signature to the service provider with at least one of the first and second authentication responses; wherein the third authentication process includes performing, at the third authentication system, in response to the attempt of the user to access the service provider, secondary authentication of the user using a third authentication factor; generating, at the third authentication system, a third authentication response to the secondary authentication of the user using the third authentication factor (e.g., the third authentication system can perform authentication with a biometric thumbprint); generating, at the third authentication system, a third partial digital signature for the third authentication response using the third private key share; combining the first and third partial digital signatures, resulting in a second composite digital signature; and transmitting the second composite digital signature to the service provider with at least one of the first and third authentication responses; validating, at the service provider, at least one of the first and second composite digital signatures using the public key; wherein the public key used for validating the first composite digital signature is identical to the public key used for validating the second composite digital signature; and providing the user with access to the service provider in response to successful validation.

In the example of the first variation, the second and the third authentication factors can be distinct possession factors (e.g., a second user device and a third user device associated with a user). However, authentication factors used in a k<l digital signature scheme can be any suitable authentication factor.

In the first variation, k and l of the (k,l)—digital signature scheme can each be any number satisfying the condition of k<l. Different digital signature schemes can be implemented for different service providers, users, user accounts, user devices, authentication systems, and/or any suitable component. For example, a k<l digital signature scheme can be implemented with a first service provider while a k=l digital signature scheme can be implemented with a second service provider. In another example, k<l digital signature schemes can be implemented with two different service providers, where the values of k and l vary depending on the service provider. In a further example, a k<l digital signature scheme can be applied to a first user but a k=l digital signature scheme can be applied to a second user.

In the first variation, digital signature schemes of k<l can be implemented at any suitable time in relation to implementation of other digital signature schemes, or at any suitable time generally. However, k<l digital signature schemes can be implemented in any suitable fashion.

2.9.B Authentication Approaches—Multiple Service Providers

In a second variation, the method 100 can include distributed trust authentication for more than one service provider. For example, the method 100 can additionally or alternatively include: performing, at the secondary authentication system (e.g., a same authentication system used to provide two-factor authentication for a user attempting to access a first service provider), in response to a first attempt of the first user to access a second service provider, authentication of the first user using a third authentication factor (e.g., an authentication factor for authentication with respect to accessing the second service provider, where the first and the second authentication factors can be used for authentication with respect to accessing the first service provider); generating, at the secondary authentication system, a third authentication response (e.g., an authentication response to authentication for accessing a second service provider, where the first and the second authentication responses are responding to authentications for accessing a first service provider) to the authentication of the first user using the third authentication factor; generating, at the secondary authentication system, a third partial digital signature for the third authentication response using the second private key share (e.g., the same private key share used by the secondary authentication system in generating a partial digital signature for a response to authentication regarding a first service provider, but can alternatively be a different private key share); combining the third partial digital signature with an additional partial digital signature, resulting in a second composite digital signature; transmitting the second composite digital signature to the second service provider; validating, at the second service provider, the second composite digital signature; and providing the first user with access to the second service provider in response to successful validation of the second composite digital signature.

In the second variation, the second service provider and the first service provider are preferably different, but can alternatively be the same service provider. The additional partial digital signature can be a first partial digital signature generated for a response to primary authentication of a user attempting to access a first service provider (e.g., a same knowledge factor used for primary authentication of the user for both a first and a second service provider), a second partial digital signature for a response to secondary authentication of the user attempting to access the first service provider (e.g., a same possession factor used for primary authentication of the user for both a first and a second service provider), a partial digital signature generated by a primary authentication system for a response to primary authentication of the user attempting to access the second service provider, and/or any suitable partial digital signature.

In the second variation, distribution trust authentication can be implemented with any number of service providers. Any suitable combination of authentication systems can be used for any suitable combination of service providers. Further, distributed trust authentication can be implemented to authenticate a user attempting to access any service provider(s) of a set of service providers in any suitable order. However, distributed trust authentication for multiple service providers can be implemented in any suitable fashion.

2.9.C Authentication Approaches—Multiple Users

Figure 4:
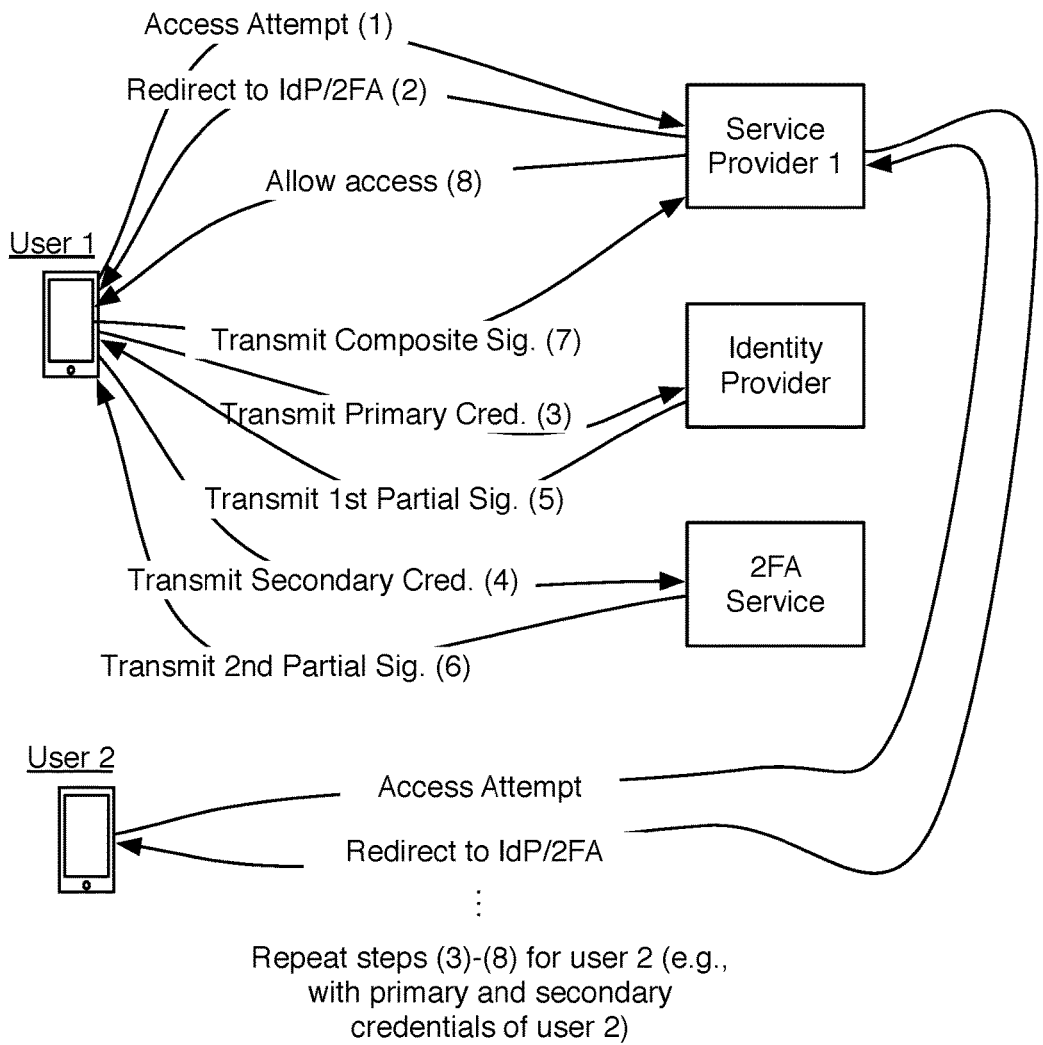
FIG. 4 is a flow diagram of authentication of two users with a service provider using a method of a preferred embodiment.

As shown in FIG. 4, in a third variation, the method 100 can include distributed trust authentication for multiple users attempting to access one or more service providers. For example, the method 100 can additionally or alternatively include: performing, at the primary authentication system, in response to an attempt of a second user to access the service provider (e.g., after a first user has attempted to access the service provider), primary authentication of the second user using a second user authentication factor (e.g., a different authentication factor, such as a different user name and password, than that used by the primary authentication system to authenticate the first user attempting to access the first service provider, but can alternatively be the same authentication factor); generating, at the primary authentication system, a third authentication response (e.g., an authentication response to authentication for a second user attempting to access the service provider, where the first and the second authentication responses are responding to authentications for the first user attempting to access a first service provider) to the primary authentication of the second user; generating, at the primary authentication system, a third partial digital signature for the third authentication response using the first private key share (e.g. the same private key share used by the primary authentication system in generating a partial digital signature for a response to authentication of the first user attempting to access the service provider, but can alternatively be a different private key share); performing, at the secondary authentication system, in response to the attempt of the second user to access the first service provider, secondary authentication of the second user using an additional second user authentication factor (e.g., a different authentication factor, such as a different one-time SMS pass code, than that used by the secondary authentication system to authenticate the first user attempting to access the first service provider, but can alternatively be the same authentication factor); generating, at the secondary authentication system, a fourth authentication response to the secondary authentication of the second user; generating, at the secondary authentication system, a fourth partial digital signature for the fourth authentication response using the second private key share (e.g. the same private key share used by the secondary authentication system in generating a partial digital signature for a response to authentication of the first user attempting to access the service provider, but can alternatively be a different private key share); combining the third and the fourth partial digital signatures, resulting in a second composite digital signature; transmitting the second composite digital signature to the first service provider with at least one of the third and the fourth authentication responses; and providing the second user with access to the first service provider in response to successful validation of the second composite digital signature.

In the third variation, the distributed trust authentication for multiple users can additionally or alternatively include distributed trust authentication for different human individuals, different user accounts (e.g., different users accounts of the same human individual), different user devices, and/or any suitable different user characteristics. Distributed trust authentication schemes can vary depending on the user, user account, user device, and/or any other suitable characteristic. For example, a distributed trust authentication scheme using a first and a second authentication system can be implemented with respect to a first subset of user accounts with access to service providers possessing less sensitive information. A distributed trust authentication scheme using the first, the second, and a third authentication system can be implemented with respect to a second subset of user accounts with access to service providers possessing more sensitive information. However, distributed trust authentication for multiple users can be implemented in any suitable fashion.

2.9.D Authentication Approaches—Overlapping Private Key Shares

Figure 8:
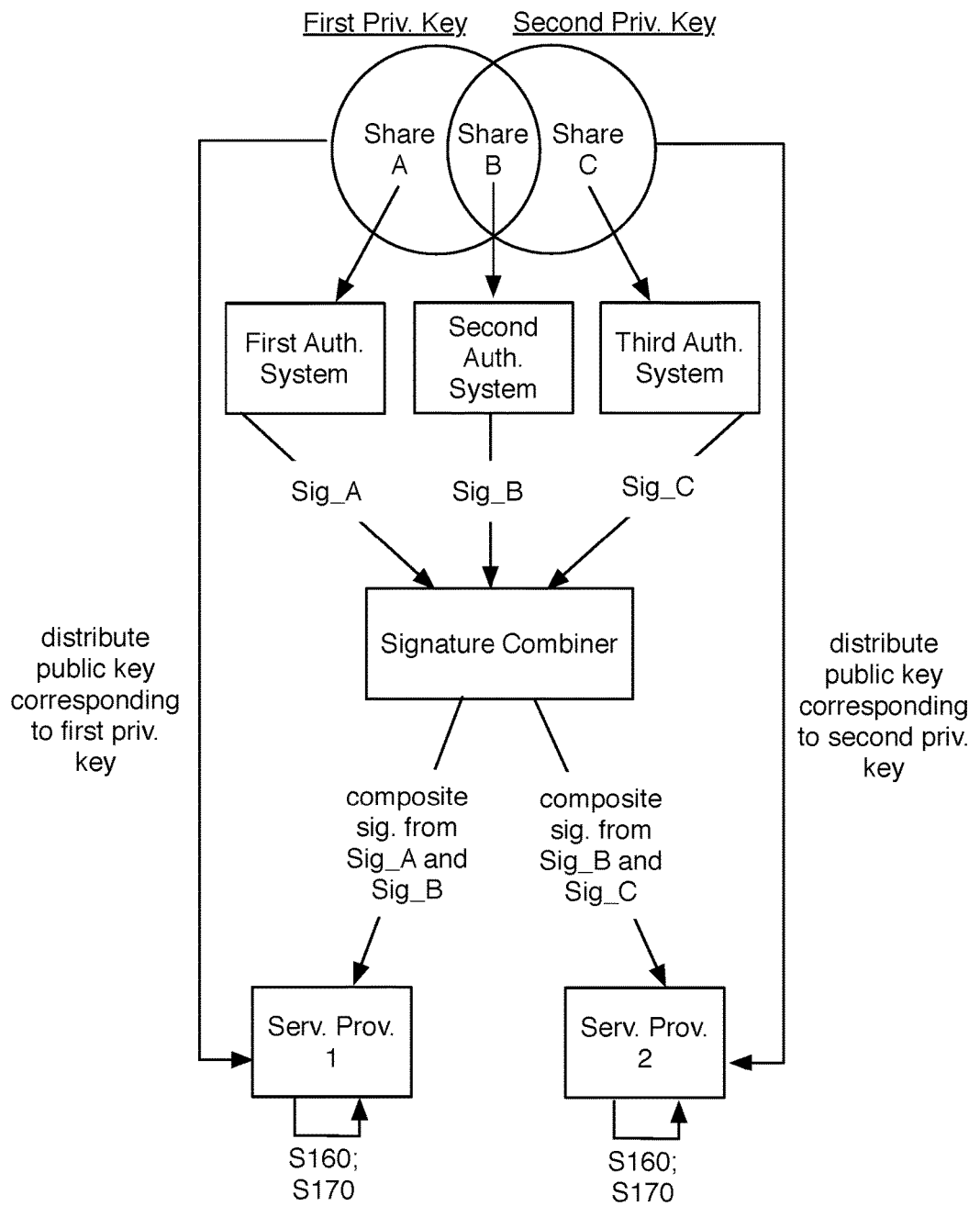
FIG. 8 is a schematic flow diagram of distributed trust authentication with overlapping private key shares.

As shown in FIG. 8, in a fourth variation, the method 100 can include distributed trust authentication using two or more private keys, where the two or more private keys include one or more overlapping private key shares, such that two or more private keys share one or more private key shares. For example, two private keys can be generated, the first private key including private key share "A" and private key share "B", and the second private key including private key share "B" and private key share "C." In the example, two service providers operating on the network can each receive a public key corresponding to one of the generated private keys. For private keys including overlapping private key shares, the private keys as well as their corresponding public keys are preferably generated at the same time, but can otherwise be generated at any suitable time.

In a specific example of the fourth variation, the method 100 can additionally or alternatively include distributing a first private key share, a second private key share, and a third private key share to a first authentication system (e.g., an Active Directory service), a second authentication system (e.g., a possession factor authentication system), and a third authentication system (e.g., an inherence factor authentication system), respectively, wherein the second and the third private key shares are non-identical; distributing, to a first service provider, a first public key paired with a first private key comprising the first private key share and the second private key share; distributing, to a second service provider, a second public key paired with a second private key comprising the second private key share and the third private key share, wherein the first and the second public keys are non-identical, wherein the second and the third authentication systems, and the first and the second service providers, do not have access to the first private key share, wherein the first and the third authentication systems, and the first and the second service providers, do not have access to the second private key share, wherein the first and the second authentication systems, and the first and the second service providers, do not have access to the third private key share; performing, at the first authentication system, in response to an attempt of a user to access at least one of the first and the second service providers (e.g., a first authentication system can be used irrespective of the service provider(s) that the user is attempting to access), primary authentication of the user using a first authentication factor; generating, at the first authentication system, a first authentication response to the primary authentication; generating, at the first authentication system, a first partial digital signature for the first authentication response using the first private key share; performing at least one of a second and a third authentication process; wherein the second authentication process includes performing, at the second authentication system, in response to the attempt of the user to access the first service provider, secondary authentication of the user using a second authentication factor; generating, at the second authentication system, a second authentication response (e.g., an authentication response identical to the first authentication response, where authentication responses by each of the authentication systems can be identical, but can alternatively be non-identical) to the secondary authentication of the user using the second authentication factor; generating, at the second authentication system, a second partial digital signature for the second authentication response using the second private key share; combining the first and second partial digital signatures, resulting in a first composite digital signature; transmitting the first composite digital signature to the first service provider with at least one of the first and second authentication responses; validating, at the first service provider, the first composite digital signature using the first public key; and providing the user with access to the first service provider in response to successful validation of the first composite digital signature, wherein the third authentication process includes performing, at the third authentication system, in response to the attempt of the user to access the second service provider, secondary authentication of the user using a third authentication factor; generating, at the third authentication system, a third authentication response to the secondary authentication of the user using the third authentication factor; generating, at the third authentication system, a third partial digital signature for the third authentication response using the third private key share; combining the first and third partial digital signatures, resulting in a second composite digital signature; transmitting the second composite digital signature to the second service provider with at least one of the first and third authentication responses; validating, at the second service provider, the second composite digital signature using the second public key; and providing the user with access to the second service provider in response to successful validation of the second composite digital signature.

In the fourth variation, the first and the second service providers are preferably different service providers. Alternatively, the first and the second service providers can be the same service provider, and the first and the second public keys (e.g., corresponding to a first and second private keys sharing a private key share) are stored at the same service provider. In this scenario, the method 100 can additionally or alternatively include attempting, at the same service provider, to validate at least one of the first and the second composite digital signatures with both of the first public key and the second public key; and providing the user with access to the same service provider in response to successful validation of the at least one of the first and the second composite digital signatures using either of the first public key or the second public key. Further, the method 100 can additionally or alternatively include providing a different scope of access if the first composite digital signature is successfully validated than if the second composite digital signature is successfully validated. Different service providers can be distributed different public keys (e.g., different public keys corresponding to different private keys sharing one or more private key shares), the same public keys, and/or any suitable public key.

In the fourth variation, the private key shares that are not shared between private keys can be distributed to the same authentication system. For example, in the specific example of the fourth variation discussed above, the second and the third authentication system can be a same authentication system, such that the second and the third private key shares are stored at the same authentication system. However, private key shares of private keys having overlapping private key shares can be distributed in any suitable manner.

In the fourth variation, a distributed trust authentication scheme can use any combination of any number of private keys and any number of overlapping private key shares. For example, a first private key can include private key shares "A", "B", and "C", a second private key can include private key shares "B", "C" and "D", and a third private key can include private key shares "D", "E" and "F." Private key shares can overlap across different distributed trust authentication schemes. For example, a k=l authentication scheme for a first service provider can utilize a first private key including private key shares "A" and "B", and a k<l authentication scheme for a second service provider can utilize a second private key including private key shares "B" and "C." However, distributed trust authentication with overlapping private key shares can be implemented in any suitable numbers.

The method of the preferred embodiment and variations thereof can be embodied and/or implemented at least in part as a machine configured to receive a computer-readable medium storing computer-readable instructions. The instructions are preferably executed by computer-executable components preferably integrated with a two-factor authentication service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for distributed trust authentication, the method comprising:
   at a service provider:
      using a common private cryptographic key of a public/private cryptographic key pair to generate a first private key share and a second private key share;
      distributing, via one or more communications networks, each of the first private key share and the second private key share to an identity provider and a remote multi-factor authentication service, respectively; and
      distributing a public cryptographic key of the public/private cryptographic key pair to one of the identity provider and the remote multi-factor authentication service, wherein whichever one of the identity provider and the remote multi-factor authentication service that has the public cryptographic key performs a validation of a combined digital signature;
   identifying an attempt, by a user operating a computing device, to authenticate to the service provider;
   validating the combined digital signature for authenticating the user, wherein:
      the combined digital signature is formed by a combination of a first digital signature and a second digital signature,
      the first digital signature being generated using the first private key share in response to a successful primary authentication of the user;
      the second digital signature being generated using the second private key share in response to a successful secondary authentication of the user,
      the first private key share and the second private key share being generated using the common private cryptographic key of the public/private cryptographic key pair;
      wherein validating the combined digital signature includes using the public cryptographic key of the public/private cryptographic key pair to validate the combined digital signature; and
   authenticating the user to the service provider based on the validation of the combined digital signature.

2. The method of claim 1, wherein validating the combined digital signature includes validating each of the first digital signature and the second digital signature of the combined digital signature using the public cryptographic key of the public/private cryptographic key pair.

3. The method of claim 1, wherein a primary authentication of the user is performed by an identity provider.

4. The method of claim 1, wherein a secondary authentication of the user is performed by a multi-factor authentication service, wherein
   at the multi-factor authentication service:
      using the common private cryptographic key of the public/private cryptographic key pair to generate the first private key share and the second private key share;
      distributing, via one or more communications networks, one of the first private key share and the second private key share to the identity provider; and
      distributing the public cryptographic key of the public/private cryptographic key pair to the service provider, wherein the service provider performs the validation of the combined digital signature.

5. The method of claim 4, wherein:
   the multi-factor authentication service comprises a two-factor authentication service that performs the secondary authentication of the user only after an indication of a successful primary authentication of the user is provided by the identity provider.

6. The method of claim 1, wherein:
   the first digital signature is received at the computing device of the user from a primary authenticator of the user;
   the second digital signature is received at the computing device of the user from a secondary authenticator of the user, wherein the first digital signature and the second digital signature are transformed into the combined digital signature by the computing device of the user, and
   transmitting by the computing device of the user, via the one or more communication networks, the combined digital signature to the service provider for performing the validation of the combined digital signature.

7. The method of claim 6, further comprising:
   transmitting a secondary authentication request from the primary authenticator to the secondary authenticator in response to the successful primary authentication of the user,
   wherein performing the secondary authentication comprises performing the secondary authentication only after receiving the secondary authentication request.

8. The method of claim 1, wherein:
   the first digital signature is received at the service provider from a primary authenticator of the user; and
   the second digital signature is received at the service provider from a secondary authenticator of the user, wherein the first digital signature and the second digital signature are transformed into the combined digital signature by the service provider.

9. The method of claim 1, wherein:
   the first digital signature is received at the multi-factor authentication service from a primary authenticator of the user;
   the first digital signature and the second digital signature are transformed into the combined digital signature by the multi-factor authentication service, and
   transmitting by the multi-factor authentication service, via the one or more communication networks, the combined digital signature to the service provider for performing the validation of the combined digital signature.

10. The method of claim 1, wherein:
generating the second digital signature by the secondary authenticator comprises generating the second digital signature in response to both of the successful primary authentication and the successful secondary authentication of the user.

11. The method of claim 1, wherein:
the primary authentication of the user is performed using an authentication method that is different from an authentication method used in the secondary authentication of the user.

12. The method of claim 1, wherein:
providing the user with authenticated access to the service provider includes providing a restricted scope of access to the service provider when only one of the first digital signature and the second digital signature of the combined digital signature is successfully validated using the public cryptographic key.

* * * * *